United States Patent
Vervisch-Picois et al.

(10) Patent No.: US 8,929,489 B2
(45) Date of Patent: *Jan. 6, 2015

(54) METHOD OF REDUCING THE GLARE OF A RECEIVER WITHIN A SYSTEM, IN PARTICULAR A GEOLOCATION SYSTEM

(75) Inventors: Alexandre Vervisch-Picois, Paris (FR); Nel Samama, Chennevieres (FR)

(73) Assignee: Institut-Telecom/Telecom Sudparis, Evry (FR)

( * ) Notice: Subject to any disclaimer, the term of this patent is extended or adjusted under 35 U.S.C. 154(b) by 52 days.

This patent is subject to a terminal disclaimer.

(21) Appl. No.: 13/807,820

(22) PCT Filed: Jul. 1, 2011

(86) PCT No.: PCT/IB2011/052915
§ 371 (c)(1),
(2), (4) Date: Feb. 5, 2013

(87) PCT Pub. No.: WO2012/001664
PCT Pub. Date: Jan. 5, 2012

(65) Prior Publication Data
US 2013/0142272 A1 Jun. 6, 2013

(30) Foreign Application Priority Data
Jul. 1, 2010 (FR) ...................................... 10 55313

(51) Int. Cl.
| | | |
|---|---|---|
| H03D 1/00 | (2006.01) | |
| H04B 15/00 | (2006.01) | |
| G01S 19/11 | (2010.01) | |
| G01S 19/21 | (2010.01) | |
| G01S 19/22 | (2010.01) | |

(52) U.S. Cl.
CPC ................ *H04B 15/00* (2013.01); *G01S 19/11* (2013.01); *G01S 19/21* (2013.01); *G01S 19/22* (2013.01)

USPC ........... 375/343; 375/130; 375/316; 375/340; 375/342; 375/345

(58) Field of Classification Search
USPC ......... 375/130, 135, 145, 259, 262, 270, 272, 375/285, 295, 297, 299, 302, 316, 318, 320, 375/340, 342, 343, 344, 345, 350
See application file for complete search history.

(56) References Cited

U.S. PATENT DOCUMENTS 6,711,219 B2 * 3/2004 Thomas et al. ............... 375/346
7,110,442 B2 * 9/2006 Lennen ......................... 375/149
(Continued)

FOREIGN PATENT DOCUMENTS

| FR | 2936640 A1 | 4/2010 |
| KR | 2006005723 | * 1/2006 |

OTHER PUBLICATIONS

Vervisch et al., Interference Mitigation in a Repeater and pseudolite Indoor Positioning System, IEEE Journal of Selected Topics in Signal Processing, *IEEE*, U.S., 2009; vol. 3, No. 5, pp. 810-820.
(Continued)

*Primary Examiner* — Hirdepal Singh
(74) *Attorney, Agent, or Firm* — Oliff PLC

(57) ABSTRACT

A method of reducing the glare of at least one receiver within a system, in particular a geolocation system, the system including: at least one first emitter emitting at least a first signal modulated by a first code, at least a second emitter emitting at least one second signal modulated by a second code, which is repetitive and potentially variable, and a third signal out of phase with respect to the second signal, the third signal being modulated by the second code delayed by a first delay, and the receiver, the latter being configured so as to detect signals emitted by the first and second emitters and implementing, for the tracking of the first signal, a local signal.

19 Claims, 3 Drawing Sheets

(56) References Cited

U.S. PATENT DOCUMENTS

| | | | |
|---|---|---|---|
| 7,362,795 B1* | 4/2008 | Lennen | 375/149 |
| 7,663,502 B2* | 2/2010 | Breed | 340/12.25 |
| 7,742,518 B2* | 6/2010 | Simpson | 375/149 |
| 8,427,988 B2* | 4/2013 | Pelletier et al. | 370/311 |
| 2006/0262013 A1* | 11/2006 | Shiroma et al. | 342/370 |
| 2007/0200757 A1 | 8/2007 | Homiller et al. | |
| 2009/0219201 A1* | 9/2009 | Martin et al. | 342/357.12 |
| 2010/0061427 A1* | 3/2010 | Lopez-Risueno et al. | 375/150 |
| 2010/0215078 A1* | 8/2010 | Rice | 375/141 |
| 2013/0113656 A1 | 5/2013 | Vervisch-Picois et al. | |
| 2013/0304347 A1* | 11/2013 | Davidson | 701/99 |
| 2014/0086282 A1* | 3/2014 | Qin | 375/150 |

OTHER PUBLICATIONS

Sung-Hyuck Im, In Gyu-Jee et al., "An Indoor Positioning System Using Time-Delayed GPS Repeater," *Ion GNSS 19th International Technical Meeting of the Satellite Division*, Sep. 2006, pp. 2478-2483.

Sung-Hyuck Im In Gyu-Jee, "Feasibility Study of Pseudolite Techniques Using Signal Transmission Delay and Code Offset," *ION 2009 International Technical Meeting*, Jan. 26-28, 2009, Anaheim, CA, pp. 798-803.

Gold, "Optimal Binary Sequences for Spread Spectrum Multi-plexing," Magnavox Research Laboratories, 1967, pp. 619-621.

Cobb, "GPS Pseudolites: Theory, Design, and Applications," Stanford University, 1997, pp. 1-152.

Jardak et. al., "Optimised tracking loop for multipath mitigation Case of repeater based indoor positioning system," ENC-GNSS 2008, 2008, pp. 1-10.

Ward et al., "Satellite Signal Acquisition, Tracking, and Data Demodulation," *Understanding GPS Principles and Application*, Artech House, 2006, 2nd Ed., Chapter 5, pp. 153-241.

Ward et al., "Interference, Multipath, and Scintillation," *Understanding GPS Principles and Application*, Artech House, 2006, 2nd Ed., Chapter 6, pp. 243-299.

Feb. 3, 2011 Search Report issued in French Patent Application No. FR 1055313.

Feb. 3, 2011 Written Opinion issued in French Patent Application No. FR 1055313.

Feb. 1, 2011 Search Report issued in French Patent Application No. FR 1055302.

Feb. 1, 2011 Written Opinion issued in French Patent Application No. FR 1055302.

Oct. 11, 2011 International Search Report issued in International Application No. PCT/IB2011/052915.

Van Dierendonck, "GPS Receivers," American Institute of Aeronautics and Astronautics, Inc., 1995, Chapter 8, vol. 1, p. 329-407.

Sep. 8, 2011 International Search Report issued in International Application No. PCT/IB2011/052916.

\* cited by examiner

| PR SNR (dB) | Satellite 1 PR Error (m) | Std (m) | Satellite 2 PR Error (m) | Std (m) | Satellite 3 PR Error (m) | Std (m) |
|---|---|---|---|---|---|---|
| $-\infty$ | 0 | 1.6 | 0 | 1.8 | 0 | 1.4 |
| -18.8 | 0 | 1.6 | 0 | 1.8 | -0.2 | 1.4 |
| -8.8 | 0 | 1.6 | 0 | 1.8 | -0.5 | 1.3 |
| 1.2 | 0 | 1.6 | 0 | 1.8 | -1.7 | 1.4 |
| 11.2 | -0.4 | 1.6 | 0.1 | 1.8 | nf | nf |
| 21.2 | -1.7 | 3.1 | 0.3 | 2.0 | nf | nf |
| 31.2 | nf | nf | nf | nf | nf | nf |
| 41.2 | nf | nf | nf | nf | nf | nf |

Fig. 10

| PR SNR (dB) | Satellite 1 PR Error (m) | Std (m) | Satellite 2 PR Error (m) | Std (m) | Satellite 3 PR Error (m) | Std (m) |
|---|---|---|---|---|---|---|
| $-\infty$ | 0 | 2.2 | 0 | 2.9 | 0 | 1.8 |
| -18.8 | 0 | 2.2 | 0 | 2.9 | 0 | 1.8 |
| -8.8 | 0 | 2.2 | 0 | 2.9 | 0 | 1.8 |
| 1.2 | 0 | 2.2 | 0 | 2.9 | 0 | 1.8 |
| 11.2 | 0 | 2.2 | 0 | 2.9 | 0 | 1.8 |
| 21.2 | 0 | 2.2 | 0 | 2.9 | 0 | 1.8 |
| 31.2 | 0 | 2.2 | -0.1 | 2.9 | 0 | 1.8 |
| 41.2 | 0 | 2.2 | 0.5 | 3.2 | -0.1 | 1.8 |

Fig. 11

METHOD OF REDUCING THE GLARE OF A RECEIVER WITHIN A SYSTEM, IN PARTICULAR A GEOLOCATION SYSTEM

BACKGROUND

The subject of the present invention is a method for reducing the glare of a receiver of a system, especially a geolocation system, the system furthermore comprising a plurality of emitters.

One of the emitters is for example a pseudolite. The expression "pseudolite" designates a terrestrial emitter transmitting signals which have the same structure as the signals dispatched by a satellite. The term "pseudolite" corresponds to the contraction of the term "pseudo-satellite". For example, a GPS (global positioning system) pseudolite emits a signal at 1.57542 GHz phase-modulated by a Gold code and a navigation message. The expression "Gold code" designates a pseudo-random binary sequence for example discussed in the article "*Optimal binary sequences for spread spectrum multiplexing*" by Robert GOLD.

A Gold code is the result of combining two time-shifted maximal length sequences. Maximal length sequences are themselves periodic binary sequences generated by shift registers (of 10 bits for GPS and 9 bits for the Russian GLONASS system). The properties of maximal length sequences are as follows: they are balanced, that is to say the number of 1s in the code is equal to the number of 0s plus 1 and, if N is the size of the sequence, the autocorrelation equals $-1/N$ away from the main peak.

The invention applies especially to systems using code-based multiplexing, also called "code division multiple access" (CDMA), this being for example the case for GPS and for GNSS (global navigation satellite system).

The phenomenon of glare ("near far"), also called the phenomenon of intrinsic interference, is a major problem occurring in systems using CDMA, the signals being emitted on the same frequency. When the codes used by the emission sources do not exercise sufficient discrimination with respect to the difference in power which may exist between the sources on reception by a receiver, this glare or intrinsic interference phenomenon occurs. When the receiver is dazzled by glare, it is no longer capable of tracking the weakest code, even by making errors. The Gold codes, used in GPS, allow a discrimination of generally between 23.9 dB and 60.2 dB between two signals originating from two distinct sources. Thus, provided that two signals have more than some twenty or so decibels of deviation in power, interference phenomena may occur.

A recently envisaged application for GPS relates to the guidance of aircraft during the landing and/or takeoff phases, this involving the deployment of a system comprising one or more emitters, for example pseudolites, to improve the precision of the vertical coordinate of the aircraft, as well as at least one receiver. As long as the airplane remains sufficiently far from the runway in proximity to which the pseudolite is placed, the extra signal emitted by the pseudolite behaves as a conventional satellite signal, but, as soon as the airplane approaches the runway, the signal of the pseudolite becomes so powerful that it dazzles the receiver through glare, so that the latter may not detect the signals arising from the other emitters, which are for example satellites.

In such a system, the receiver receives for example the signals coming from the pseudolite and the satellites simultaneously and correlates the signal resulting from this reception with a local replica, also subsequently called the "local signal", of the signal emitted by one of the emitters of the system and that it wishes to track. If the signal that it wishes to track has the lowest power, the peaks in the cross-correlation between the local signal and the other more powerful signals may take values which may disturb the main correlation peak of the tracked signal, or indeed even jam it totally in the case where the tracked signal is particularly attenuated with respect to the other signals.

A known solution for solving this problem of glare consists in using pseudolites whose emission is pulsed, as explained for example in the publication "*GPS pseudolites: theory, design and applications*" H. Stewart Cobb or in the work "*Global positioning system: theory and applications*" Bryant D. ELROD A. J. VAN-DIERENDONCK. Nonetheless, such a technique may not turn out to be sufficient and be relatively complex to implement.

Other techniques have also been proposed for solving the problem of glare mentioned hereinabove, such as frequency shifting, also called "frequency offset", or else frequency jumping, also called "frequency hopping".

There exists a need to have a method for reducing the glare of at least one receiver within a system comprising several emitters, which is relatively simple to implement, effective and inexpensive.

SUMMARY

The aim of the invention is to address this need and it achieves same, according to one of its aspects, by virtue of a method for reducing the glare of at least one receiver within a system, especially a geolocation system, the system comprising:

at least one first emitter emitting at least one first signal modulated by a first code, at least one second emitter emitting at least one second signal modulated by a repetitive and potentially variable second code and a third signal phase-shifted with respect to the second signal, the third signal being modulated by the second code delayed by a first delay, and the receiver, the latter being configured to detect the signals emitted by the first and second emitters and implementing, for the tracking of the first signal, a local signal, in which method:

a first correlation quantity is calculated for the correlation between the local signal of the receiver modulated by the first code and a signal resulting from a combination of at least the first, second and third signals, a second correlation quantity is calculated for the correlation between the local signal of the receiver modulated by the first code delayed by the first delay and the signal resulting from the combination of at least the first, second and third signals and, the first and second correlation quantities are combined to improve the signal/noise ratio of the first signal received by the receiver while reducing the glare of the receiver by the second signal.

According to the invention, the second emitter emits both the second and the third signal, according to a method of "double emission". The emission of the third signal emitted by the second emitter in addition to the second signal, the third signal being phase-shifted with respect to the latter and being modulated by a code delayed with respect to that modulating the second signal, makes it possible to reduce the interference induced by one emitter on another.

Furthermore, according to the invention, the third signal which makes it possible to reduce, and especially to remove, the glare of the receiver is emitted by the same emitter as the second signal. All the physical phenomena undergone by the second signal can thus be the same as those undergone by the third signal, this may make it possible to also eliminate the interference related to the indirect paths of the second signal.

Furthermore, the emission of the second and third signals by the same emitter may make it possible to reduce, or indeed to eliminate, energy wastage since it is possible to recover all of the energy originating from the second and third signals, leading to an appreciable improvement in the signal/noise ratio after the correlation operations.

The expression "repetitive and potentially variable code" designates a code comprising a plurality of successive sequences, each sequence exhibiting the same duration, also called the "duration of the code". From one sequence to another, the code can be repeated identically, for example when dealing with a periodic code, in which case the duration of the code corresponds to its period. As a variant, from one sequence to another, the code takes different values. The first code may also be repetitive and potentially variable, especially being periodic.

The first code and the second code can exhibit the same code duration, for example the same period.

The first delay may be equal to within 1% to half the duration of the second code. When the second code is periodic, the first delay is for example equal to 1% to half a period of the second code.

The phase shift between the second and the third signal may be equal to 180° to within 10%.

With the values hereinabove, the method according to the invention may make it possible to eliminate the signal arising from the second emitter by combining the first and second correlation quantities, thus allowing the receiver to satisfactorily track the first signal emitted by the first emitter.

The ratio between the power of the second signal and the power of the first signal may be greater than 24 dB. Thus, the invention can allow the tracking of the first signal although the latter exhibits a much smaller amplitude than that of the second signal.

The second emitter is for example fixed with respect to the receiver.

The first emitter may be mobile with respect to the receiver, being for example a satellite.

The first, second and third signals may be signals used in the GPS or GNSS systems, these signals implementing code-based multiplexing.

The first and second codes may be Gold codes, also called C/A ("Coarse acquisition") codes in the case of GPS. A Gold code is periodic, has a length of 1023 moments and it is clocked at 1.023 MHZ. The smallest period of the Gold codes is 1 ms in the case of GPS.

The first and second signals may be emitted simultaneously, that is to say at the same moment by the first and second emitters. The second and third signals may be emitted simultaneously, that is to say at the same moment by the second emitter.

The first, second and third signals can have the same carrier frequency, which is for example the frequency L1, according to the terminology in force in the GPS or GNSS systems, this frequency being equal to 1.57542 GHz.

The first emitter may be a satellite and the second emitter may be a pseudolite.

The method may be implemented in an outside setting, for example for the guidance of an aircraft in the phases of landing and/or takeoff from a runway.

The local signal used to calculate the first correlation quantity and the local signal used to calculate the second correlation quantity can exhibit in-phase local carriers, the local signal used to calculate the first correlation quantity and the local signal used to calculate the second correlation quantity differing for example then only by the delay of the first code. In the case where the receiver is static with respect to the emitters, a first local carrier in phase with the second local carrier may make it possible to reduce, or indeed to remove, the glare of the receiver.

As a variant, the local signal used to calculate the second correlation quantity may exhibit a local carrier, subsequently called the "second local carrier", which may be phase-shifted, especially according to a variable phase shift, with respect to the local carrier of the local signal used to calculate the first correlation quantity, the latter subsequently being called the "first local carrier". Such first and second local carriers may make it possible to achieve the aim mentioned hereinabove when the receiver moves with respect to the emitters since it is thus possible to take account of the Doppler effect induced by this movement of the receiver. The second local carrier exhibits for example a predetermined phase shift for a fraction of the period of calculation of the second correlation quantity and a phase shift value equal to the opposite of said predetermined value during the remaining duration of the period of calculation of the second correlation quantity.

For example, the second correlation quantity may be calculated according to an integration time T equal to the period of the second code and the phase shift of the second local carrier with respect to the first local carrier may be equal to $\alpha$ on the interval $[t, t+T/2]$ and to $-\alpha$ on the interval $[t+T/2, t+T]$.

The phase shift of the second local carrier may be calculated on the basis of the Doppler frequency of the signal emitted by the emitter of highest power.

As a variant, the receiver may be configured to generate different local signals, each signal having a local carrier phase calculated on the basis of the Doppler frequency of a different emitter of the system.

The second and third signals can exhibit the same carrier.

The first and second correlation quantities may be calculated and/or combined together by the receiver. The combination operation for combining the first and second correlation quantities is for example a linear combination, especially an addition or a subtraction.

The first and the second code can exhibit the same code duration, or the same period, and the first emitter can also emit, in addition to the first signal, another signal differing from the first signal only by the fact that it is modulated by the first code delayed by the first delay.

The subject of the invention is further, according to another of its aspects, a system, especially a geolocation system, comprising:
  a first emitter emitting at least one first signal,
  at least one second emitter emitting at least one second signal modulated by a repetitive and potentially variable, especially periodic, second code, and
  at least one receiver configured to detect the signals emitted by the first and second emitters and utilizing, for the tracking of the first signal, a local signal, the second emitter being configured to emit, especially simultaneously, the second signal and a third signal phase-shifted with respect to the second signal and modulated by the second code delayed by a first delay.

The first delay may be equal to within 1% to half the duration, especially to a half-period, of the second code.

The phase shift between the second and the third signal may be equal to 180° to within 10%.

The subject of the invention is further, according to another of its aspects, an emitter intended to be used within a system, especially a geolocation system, comprising at least one other emitter and a receiver configured to detect the signals emitted by said emitter and the other emitter, said emitter being configured to:

emit, especially simultaneously, one signal modulated by a code and another signal phase-shifted with respect to said signal, the other signal being modulated by said code delayed by a delay.

The subject of the invention is further, according to another of its aspects, a receiver intended to be used within a system, especially a geolocation system, comprising at least one first emitter emitting at least one first signal modulated by a first code and at least one second emitter emitting at least one second signal modulated by a repetitive and potentially variable, especially periodic, second code, the second emitter furthermore emitting, especially simultaneously with the emission of the second signal, at least one third signal phase-shifted with respect to the second signal and modulated by the second code delayed by a first delay, the receiver being configured to:
track the first signal, the tracking of the first signal implementing a local signal of the receiver,
calculate a first correlation quantity for the correlation between the local signal of the receiver having a first local carrier and being modulated by the first code and a signal resulting from a combination of at least the first, second and third signals,
calculate a second correlation quantity for the correlation between the local signal of the receiver having a second local carrier and being modulated by the first code delayed by the first delay and the signal resulting from the combination of at least the first, second and third signals and,
combine the first and second correlation quantities.

The first and second local carriers may be such as mentioned hereinabove.

BRIEF DESCRIPTION OF THE DRAWINGS

The invention may be better understood upon the reading which will follow, of nonlimiting examples of implementation of the latter and upon examining the appended drawing in which.

DETAILED DESCRIPTION OF THE EMBODIMENTS

Figure 1:
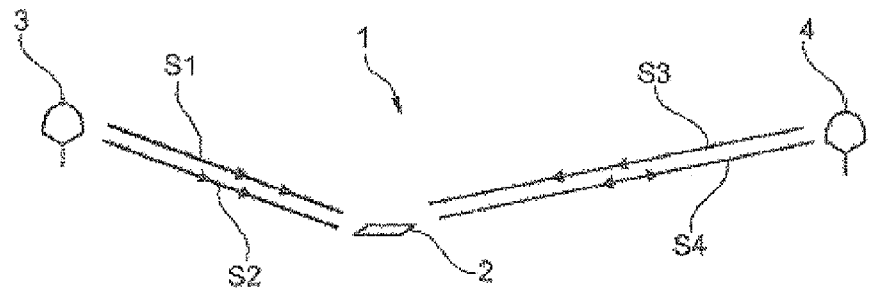
FIG. 1 represents in a schematic manner a system in which the method according to the invention may be implemented.

A system 1 of GPS or GNSS type according to a first exemplary implementation of the invention has been represented in FIG. 1.

The system 1 comprises a receiver 2 and a plurality of emitters. The receiver 2 comprises inter alia an antenna and tracking loops, which will be described subsequently, effected through software and/or hardware and represented in FIG. 4.

In the example illustrated, the emitters comprise a first emitter 3 and a second emitter 4. The first emitter 3 is mobile with respect to the receiver 2 while the second emitter 4 is fixed with respect to the receiver 2, they being for example secured to the ground. The first emitter 3 emits signals S1 and S2, with $$S1(t) = A_1 \sin(2\pi \cdot (f_{L1} + f_1) \cdot t + \theta_1) \cdot D_1(t) \cdot c_1(t - d_1)$$

$$S2(t) = A_1 \sin(2\pi \cdot (f_{L1} + f_1) \cdot t + \theta_1) \cdot D_1(t) \cdot c_1(t - \phi - d_1)$$

$A_1$ being the amplitude of the signal arising from the first emitter 3 at the level of the reception antenna of the receiver 2, $f_{L1}$ being the carrier frequency of the signal, for example the frequency L1 of GPS or GNSS signals, $f_1$ being the Doppler frequency of the signal arising from the first emitter at the level of the reception antenna of the receiver 2 including the drift of the clock bias of the receiver, $\theta_1$ being the phase of the carrier of the signal arising from the first emitter at the level of the reception antenna, $D_1$ being the navigation message of the first emitter, $c_1$ being the code modulating the signal of the first emitter, in the example considered a periodic code, for example a Gold code, $d_1$ being the pseudo-distance between the first emitter 3 and the antenna of the receiver 2 including the clock bias of the receiver 2.

The first emitter may be a satellite and the second emitter a pseudolite.

For convenience of expression, it has been chosen to include in the signal emitted by the first emitter 3 the effects related to the clock bias and to its drift.

As may be noted by comparing the expressions for the signals S1 and S2, the latter differ through the fact that, although the code modulating the signals S1 and S2 is the same, the code modulating the signal S2 is delayed by a first delay $\phi$ with respect to the code modulating the signal S1. The signals S1 and S2 emitted by the first emitter 3 moreover have the same carrier in the example described.

The second emitter 4 emits signals S3 and S4 with the following expressions:

$$S3(t) = A_2 \sin(2\pi \cdot (f_{L1} + f_2) \cdot t + \theta_2) \cdot D_2(t) \cdot c_2(t - d_2)$$

$$S4(t) = A_2 \sin(2\pi \cdot (f_{L1} + f_2) \cdot t + \theta_2) \cdot D_2(t) \cdot c_2(t - \phi - d_2) \quad (4.1)$$

The data $A_2$, $f_{L1}$, $f_2$, $\theta_2$, $D_2$, $c_2$, $d_2$ are defined in relation to the second emitter 4 similarly to what has just been stated in respect of the first emitter 3. In the example considered $c_2$ is a periodic code.

As may be noted by comparing the expressions for the signals S3 and S4, the latter differ by the delay $\phi$ of the code modulating the signal S3 with respect to the code modulating the signal S4 but also through the fact that the signal S4 is phase-shifted by 180° with respect to the signal S3. It may be noted that the signals S3 and S4 emitted by the second emitter 4 have the same carrier.

In the example described, the value of the amplitude $A_2$ is greater than the value of the amplitude $A_1$, the ratio between $A_2$ and $A_1$ being for example greater than or equal to 12 dB, corresponding to a power ratio between the signals S1 or S2 and S3 or S4 of greater than 24 dB.

The signals emitted by the first and second emitters 3 and 4 are received by the antenna of the receiver 2 and then amplified and converted into intermediate frequency (FI), which is lower than the frequency $f_{L1}$.

In the example considered, these signals are sampled, and then digitized before being processed by the reception channels of the receiver. These reception channels implement tracking loops represented in FIG. 4.

These loops comprise two phase-locked loops, the PLL loop 8 and the DLL loop 9, serving to demodulate respectively the carrier and the code of the signal of the first emitter 3.

For the tracking of the first signal, the receiver uses a local replica of the signal decomposed into two distinct elements: carrier and code, that the loops 8 and 9 synchronize permanently with the signal emitted by the first emitter. As many emitters as there are channels in the receiver can be tracked in parallel.

Figure 4:
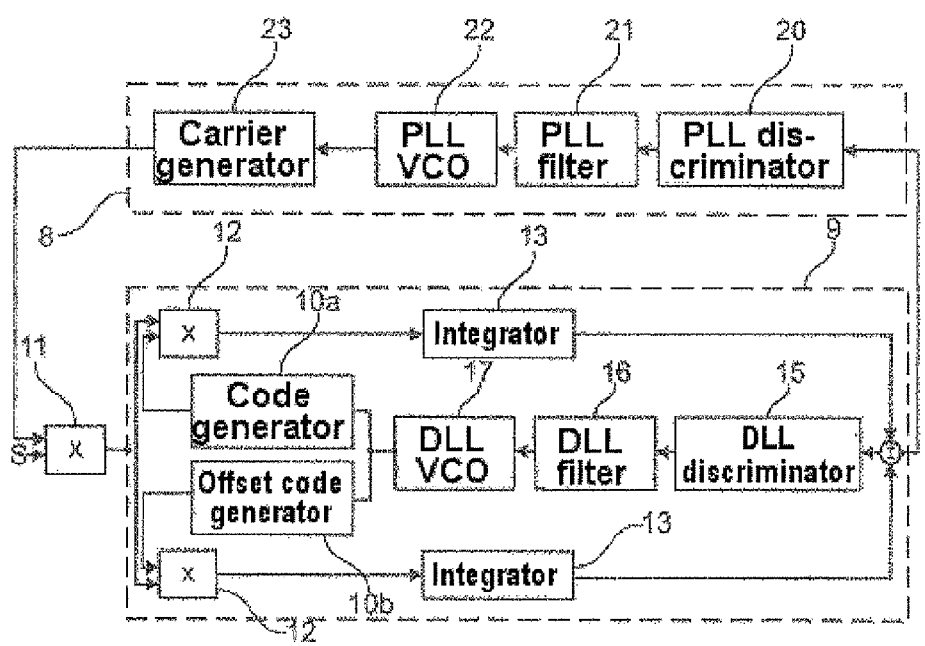
FIG. 4 is a functional diagram of a receiver's tracking loop according to a first exemplary implementation of the invention.

FIG. 4 shows the tracking loops 8 and 9, embedded one in the other and using the same correlators (or integrators).

The local signal in a channel of the receiver 2 may be modeled in a grouped form as follows:

$$S_{loc,i}(t,\tau) = \sin(2\pi \cdot (FI + f_{loc}) \cdot t + \theta_{loc}) \cdot c_i(t-\tau)$$

$f_{loc}$ corresponds to the Doppler frequency of the local signal on the carrier and $\theta_{loc}$ corresponds to the phase on this carrier, including the clock bias and drift of the receiver 2, $\tau$ is the delay induced on the code i being tracked, which in the example illustrated is the code $c_1$ modulating the signals S1 and S2 emitted by the first emitter 3.

The DLL loop 9 will firstly be described. The objective of the latter is to synchronize the local code of the receiver on the incident code which in the example illustrated is the code $c_1$ modulating the signals emitted by the first emitter 3. This loop is for example the so-called "Early minus Late" (or "Advance minus Delay") loop that is sometimes also called SDLL for Standard DLL.

This loop comprises code generators 10 configured to create three replicas of the code: a generator 10a creating a replica in advance by 0.5 chips (a chip designating here a code moment or code bit) called E (Early) and a replica delayed by 0.5 chips called L (Late) and a generator 10b creating a replica with no phase offset called P (Prompt). These replicas make it possible to ensure the operation of the discriminator 15, which will be described hereinafter, of the loop 9 and are generated on the basis of the control signal of the VCO 17 which will also be described subsequently.

The incident signal S=S1+S2+S3+S4 is mixed by a mixer 11 with the local replicas of the carrier and then with the three replicas of the local code which arise from the code generator 10 by mixers 12.

The resulting signal is summed by the integrators 13 over a time Ts which is the integration time of the loops. This operation has two objectives: it plays the role of both low-pass filter and of correlator.

The low-pass filtering makes it possible to eliminate the high-frequency part at $f_{loc}$+FI.

In the integrators 13, six correlation operations are performed, these being designated as follows:
IP corresponds to the in-phase Prompt correlation
IE corresponds to the in-phase Early correlation
IL corresponds to the in-phase Late correlation
QP corresponds to the quadrature Prompt correlation
QE corresponds to the quadrature Early correlation and,
QL corresponds to the quadrature Late correlation The results at the output of the integrators 13 are thereafter dispatched to the discriminator 15.

The discriminator 15 of the loop 9 is configured to detect the phase error between the code $c_1$ of the signal that it is sought to track and the local code. The following formula for D is chosen for example but in a nonlimiting manner in a normalized version of the discriminator $$D = \frac{\sqrt{IE^2 + QE^2} - \sqrt{IL^2 + QL^2}}{\sqrt{IE^2 + QE^2} + \sqrt{IL^2 + QL^2}}$$

The discriminator is balanced when the early correlation is equal to the late correlation.

The output of the discriminator is linear for an error of between 0.5 and −0.5 chips, being able to operate up to ±1.5 chips without diverging.

The discriminator 15 makes it possible to obtain the corresponding phase shift between the code of the signal that it is sought to track and the code of the local signal, thereby allowing the loop 9 to correct by the necessary amount the phase of the local code that it generates.

The signal at the output of the discriminator 15 is thereafter processed by a filter 16 configured to reduce the noise in the loop 9. This filter 16 can also make it possible to eliminate the residual spurious signals caused either by outside interference, or by cross-correlation with the other signals.

The filter 16 is for example an active low-pass filter affording gain in the passband. It is possible to act on the following parameters according to the objective sought:
the order of the filter and,
the equivalent noise band Bn.

The expression "order of the filter" should be understood to mean the number of reactive elements, such as inductors and capacitors, which make up the electronic equivalent of the digital filter. A high filter order can confer better resilience in the dynamic regime, the loop 9 then being capable of following the accelerations, but being more sensitive to noise and above all more unstable.

As regards the equivalent noise band, the higher is Bn, the more it is possible to tolerate frequency excursions in the loop and the greater the possibility of catering for significant dynamic loadings. On the other hand, the noise may be higher. The loop 9 being very noisy but relatively static (the variations in the Doppler on the code are very low from one integration to the next), the value of Bn chosen is in general fairly low. A typical value of Bn is 0.5 Hz for the loop 9. In other examples, Bn may be as small as 0.05 Hz.

When the loop 9 is balanced, the output of the filter 16 corresponds to the Doppler difference between the code $c_1$ of the incident signal and the local code of the receiver 2. The output of the filter 16 is then received at the input of the VCO (voltage controlled oscillator) 17.

The VCO 17 performs an operation of integrating the signal at the output of the filter 16 to obtain a phase, a clock signal then being generated on the basis of this phase and of the central frequency of the VCO, which equals for example 1.023 MHz, this clock signal thereafter driving the code generator 10.

The operation of the PLL loop 8 will now be described. This loop 8 is configured to demodulate the carrier of the incident signal. It entails for example a Costas loop, the latter having especially the particular feature of being insensitive to the phase jumps $\pi$ which arise because of the bits of the navigation message and of the traversal of the high layers of the atmosphere, which may turn out to be advantageous when one of the emitters is a satellite.

This loop 8 comprises a discriminator 20 whose standardized formula is for example but nonlimitingly $$D = \arctan\left(\frac{QP}{IP}\right)$$

with QP and IP such as already defined above.

The signal at the output of the discriminator 20 is thereafter processed by a filter 21 which is of the same type as the filter 16 described previously. The order of the filter 21 is for example equal to n+1, when n is the order of the filter 16, and the value of Bn of the filter 21 is greater than that of the filter 16, lying for example between 10 Hz and 18 Hz.

The signal at the output of the filter 21 is thereafter processed by a VCO 22 specific to the loop 8, this VCO 22 operating in the same manner as the VCO 17 described previously.

The signal at the output of the VCO 22 thereafter drives a carrier generator 23.

In the example of FIG. 4, the VCO 17 of the loop 9 receives as input only the signal at the output of the filter 16.

In a variant, not represented, the signal at the output of the filter 21 is also transmitted to the VCO 17 of the loop 9, the VCO 17 then generating a clock signal with the aid of the output of the filter 16 of the loop 9 and of the filter 21 of the loop 8. The signal at the output of the filter 16 is divided by the ratio between the frequency $f_{L1}$ and the frequency of the code, that is to say by 1540 in the example described. Such a recovery of the signal at the output of the filter 21 can especially make it possible to use values as small as 0.05 Hz for the equivalent noise band Bn of the filter 16 of the loop 9.

The processing performed by the receiver 2, when it receives the signal S corresponding to the sum of the signals S1 to S4, the expressions for which were given hereinabove, will now be described.

These signals S1 to S4 are for example emitted simultaneously by the emitters 3 and 4.

The signal at the level of the antenna of the receiver 2 placed in the zone where location must be carried out corresponds to the following equation (4.1):

$$S(t) = A_1 \sin(2\pi \cdot (f_{L1} + f_1) \cdot t + \theta_1) \cdot D_1(t) \cdot [c_1(t - d_1) + c_1(t - \varphi - d_1)] +$$
$$A_2 \sin(2\pi \cdot (f_{L1} + f_2) \cdot t + \theta_2) \cdot D_2(t) \cdot [c_2(t - d_2) - c_2(t - \varphi - d_2)] + n(t)$$

where n(t) corresponds to the thermal noise and to the other sources of interference.

In a first approach, it may be considered that there is no navigation message or that the correlation always happens inside one and the same message bit (therefore with no transition).

In the example illustrated the receiver is configured to track the signal emitted by the first emitter 3. It is accordingly desirable to reduce, or indeed to totally eliminate, the intercorrelation products related to the presence of the signals emitted by the second emitter 4.

Accordingly, the receiver 2 calculates a first correlation quantity for the correlation between the signal S and a first local signal of the receiver, adapted to the tracking of the signals emitted by the first emitter 3. As may be seen, this first local signal is modulated by the code $c_1$ modulating the signals emitted by the first emitter 3, according to the following equation (4.2):

$$S_{loc,1}(t,\tau) = \sin(2\pi \cdot (FI + f_{loc}) \cdot t + \theta_{loc}) \cdot c_1(t - \tau)$$

In this equation, $f_{loc}$ corresponds to the Doppler control of the VCO 22 of the loop 8 and $\theta_{loc}$ is its accumulated phase.

For the calculation of the first correlation quantity, the integration time may be chosen equal to T, T corresponding to the duration of a period of the code $c_1$ and of the code $C_2$. When it is integrated over more than one code, what will be described hereinbelow is applied as many times as there are codes.

The signal S of (4.1) is correlated with the local replica of the signal $S_{loc}(t,\tau)$ of equation (4.2), and the first correlation quantity $R_1(\tau)$ is obtained, the expression for which is given by equation (4.3) hereinbelow.

$$R_1(\tau) =$$
$$\frac{A_1}{T} \int_{t=0}^{t=T} \cos(2\pi(f_1 - f_{loc}) \cdot t + \theta_1 - \theta_{loc}) \cdot c_1(t - d_1) \cdot c_1(t - \tau) \cdot dt + n(\tau) +$$
$$\frac{A_1}{T} \int_{t=0}^{t=T} \cos(2\pi(f_1 - f_{loc}) \cdot t + \theta_1 - \theta_{loc}) \cdot c_1(t - \varphi - d_1) \cdot c_1(t - \tau) \cdot dt +$$
$$\frac{A_2}{T} \int_{t=0}^{t=T} \cos(2\pi(f_2 - f_{loc}) \cdot t + \theta_2 - \theta_{loc}) \cdot c_2(t - d_2) \cdot c_1(t - \tau) \cdot dt -$$
$$\frac{A_2}{T} \int_{t=0}^{t=T} \cos(2\pi(f_2 - f_{loc}) \cdot t + \theta_2 - \theta_{loc}) \cdot c_2(t - \varphi - d_2) \cdot c_1(t - \tau) \cdot dt$$

In parallel, a second correlation quantity is calculated by the receiver 2 for the correlation between the signal S(t) and a second local signal which differs in the example described from the first local signal only through the fact that the code of this second local signal is phase-shifted by a delay equal to the first delay $\varphi$ already mentioned hereinabove.

Equation (4.4) hereinbelow is obtained.

$$R_1(\tau - \varphi) =$$
$$\frac{A_1}{T} \int_{t=0}^{t=T} \cos(2\pi(f_1 - f_{loc}) \cdot t + \theta_1 - \theta_{loc}) \cdot c_1(t - d_1) \cdot c_1(t - \varphi - \tau) \cdot dt +$$
$$n(\tau) + \frac{A_1}{T} \int_{t=0}^{t=T} \cos(2\pi(f_1 - f_{loc}) \cdot t + \theta_1 - \theta_{loc}) \cdot$$
$$c_1(t - \varphi - d_1) \cdot c_1(t - \varphi - \tau) \cdot dt +$$
$$\frac{A_2}{T} \int_{t=0}^{t=T} \cos(2\pi(f_2 - f_{loc}) \cdot t + \theta_2 - \theta_{loc}) \cdot c_2(t - d_2) \cdot c_1(t - \varphi - \tau) \cdot dt -$$
$$\frac{A_2}{T} \int_{t=0}^{t=T} \cos(2\pi(f_2 - f_{loc}) \cdot t + \theta_2 - \theta_{loc}) \cdot c_2(t - \varphi - d_2) \cdot c_1(t - \varphi - \tau) \cdot dt$$

Given that it is assumed that the receiver is static with respect to the emitters, it is possible to make the following approximation in expressions (4.3) and (4.4) for the first and second correlation quantities: $f_1 = f_2 \approx f_{loc}$.

The measurement of $f_{loc}$ then corresponds according to this assumption to the drift of the clock bias which can take a value of several kHz.

By making this approximation, by writing:

$$R_{kk}(\tau) = \frac{A_k \cos(\theta_k - \theta_{loc})}{T} \int_{t=0}^{t=T} c_k(t - d_k) \cdot c_k(t - \tau) \cdot dt \quad (4.5)$$

$$R_{kj}(\tau) = \frac{A_j \cos(\theta_j - \theta_{loc})}{T} \int_{t=0}^{t=T} c_j(t - d_j) \cdot c_k(t - \tau) \cdot dt \quad (4.6)$$

By applying appropriate changes of variables, and by taking into account the fact that the function under the integrals of (4.5) and (4.6) is periodic with period T, it is possible to simplify expressions (4.3) and (4.4) for the first and second correlation quantities which then become respectively, according to equations (4.7) and (4.8):

$$R_1(\tau) = R_{11}(\tau) + R_{11}(\tau-\phi) + R_{12}(\tau) - R_{12}(\tau-\phi) + n(\tau) \quad (4.7)$$

$$R_1(\tau-\phi) = R_{11}(\tau+\phi) + R_{11}(\tau) + R_{12}(\tau+\phi) - R_{12}(\tau) + n(\tau) + n(\tau) \quad (4.8)$$

In equations (4.7) and (4.8), the "useful" correlation terms are the terms in $R_{11}$ since it is sought to track the signals emitted by the first emitter 3.

The interference terms that one seeks to eliminate are the terms in $R_{12}$, also called the cross-correlation terms.

Thereafter the first and second correlation quantities $R_1(\tau)$ and $R_1(\tau-\phi)$ are added together. This done, the result according to equation (4.9) is obtained, neglecting the thermal noise n(t):

$$R_1(\tau) + R_1(\tau-\phi) = 2 \cdot R_{11}(\tau) + R_{11}(\tau-\phi) + R_{11}(\tau+\phi) + R_{12}(\tau+\phi) - R_{12}(\tau-\phi) \quad (4.9)$$

It is noted that in the expression resulting from the addition of the first and second correlation quantities, the terms $R_{12}(\tau)$ have disappeared.

There then remain two interference terms $R_{12}(\tau+\phi)$ and $R_{12}(\tau-\phi)$ and three useful-signal terms $R_{11}(\tau)$, $R_{11}(\tau-\phi)$ and $R_{11}(\tau+\phi)$.

In order for the interference to be entirely eliminated, the first delay $\phi$ must be such that relation (4.10) hereinbelow is satisfied:

$$R_{12}(\tau+\phi) - R_{12}(\tau-\phi) = 0$$

A sufficient condition for relation (4.10) hereinabove to be satisfied is that the function $R_{12}$ be periodic, this actually being the case when $R_{12}$ is an intercorrelation or autocorrelation function.

The smallest period of the function $R_{12}$ equals $NT_c$, N being the number of moments in a code, N being for example 1023 for a GPS code on L1, and $T_c$ being the duration of a code moment.

Given that the shift separating the two terms of (4.10) is equal to $2\phi$, a period equal to $2\phi$ of the function $R_{12}$ makes it possible to satisfy relation (4.10).

Thus, by choosing the first delay $\phi$ in such a way that $2\phi = NT_c$

That is to say that:

$$\varphi = \frac{NT_c}{2} = \frac{T}{2} = T_{1/2}$$

In the example described, it is possible to eliminate the terms for the interference between the signals of the first and second emitters by choosing the first delay $\phi$ equal to half a period of the code $c_1$.

In the case of the code $c_1$ used in the example considered, the half-period represents 511.5 code moments and thus corresponds to 0.5 ms.

Furthermore, the useful signal that one seeks to recover with the receiver 2, that is to say the correlation terms $R_{11}(\tau)$, $R_{11}(\tau-\phi)$ and $R_{11}(\tau+\phi)$ corresponding to the first emitter 3, is not affected by the value of first delay hereinabove.

Indeed, the function $R_{11}$ itself being T periodic, after addition of the first and second correlation quantities, we obtain in equation (4.9):

$$2 \cdot R_{11}(\tau) + R_{11}(\tau-T_{1/2}) + R_{11}(\tau+T_{1/2}) = 2 \cdot R_{11}(\tau) + 2 \cdot R_{11}(\tau-T_{1/2}) \quad (4.12)$$

Figure 2:
FIGS. 2 and 3 are representations of correlation quantities.

The result of combining the first and second correlation quantities is represented in FIG. 2 in which the phase shift $\tau$ in equation (4.12) between the codes of the incident signal and the code of the local signal is plotted as abscissa and the value of the correlation as ordinate. As may be seen, there are two distinct correlation peaks 6, shifted by half a code period, but which nevertheless carry the same information. This shift between the two correlation peaks, may make it possible to track the code modulating the first emitter 3 without any problem of interference due to the second emitter 4.

In the example described, only the secondary peak of the other function $R_{11}$ remains, but as the interference signal originates from the same antenna, its level is tiny.

If, in contradistinction to what has just been described, the receiver 2 seeks to track the signals emitted by the second emitter 4, the expression for the local signals implemented by the receiver 2 is now $$S_{loc,2}(t,\tau) = \sin(2\pi \cdot (FI+f_{loc}) \cdot t + \theta_{loc}) \cdot c_2(t-\tau) \text{ and}$$

$$S_{loc,2}(t,\tau-T_{1/2}) = \sin(2\pi \cdot (FI+f_{loc}) \cdot t + \theta_{loc}) \cdot c_2(t-\tau-T_{1/2})$$

$T_{1/2}$ corresponds to the half-period of the code $c_2$ modulating the signals emitted by the second emitter 4. In the case where $c_1$ and $c_2$ have the same period, $T_{1/2}$ has the same value as previously.

A first correlation quantity is calculated, as previously, by correlating the signal S(t) according to equation (4.1) with the local signal $S_{loc,2}(t,\tau)$ and a second correlation quantity is calculated by correlating the signal S(t) with the local signal $S_{loc,2}(t,\tau-T_{1/2})$. We do not rewrite the equations in full since they proceed from the same logic.

The respective expressions for the first and second correlation quantities are then equations (4.15) and (4.16) below:

$$R_2(\tau) = R_{21}(\tau) + R_{21}(\tau-T_{1/2}) + R_{22}(\tau) - R_{22}(\tau-T_{1/2}) + n(\tau) \quad (4.15)$$

$$R_2(\tau-T_{1/2}) = R_{21}(\tau+T_{1/2}) + R_{21}(\tau) + R_{22}(\tau+T_{1/2}) - R_{22}(\tau) + n(\tau) \quad (4.16)$$

Combination of the two correlation quantities hereinabove can thereafter be performed by the receiver 2. In the example considered, this combination is a subtraction.

The result according to equation (4.17) hereinbelow is then obtained:

$$R_2(\tau) - R_2(\tau-T_{1/2}) = 2 \cdot R_{22}(\tau) - R_{22}(\tau-T_{1/2}) - R_{22}(\tau+T_{1/2}) + R_{21}(\tau-T_{1/2}) - R_{21}(\tau+T_{1/2})$$

Given that the terms $R_{22}$ and $R_{21}$ are T periodic, equation (4.17) can be simplified as:

$$R_2(\tau) - R_2(\tau-T_{1/2}) = 2 \cdot R_{22}(\tau) - 2 \cdot R_{22}(\tau-T_{1/2})$$

Figure 3:
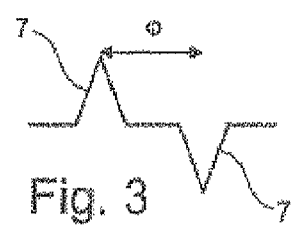

The result of combining the first and second correlation quantities is represented in FIG. 3. As may be seen, there are two distinct correlation peaks 7, shifted by half a code period and phase-shifted by 180°, but which however carry the same information.

The result obtained within the framework of the tracking of the signals emitted by the second emitter 4 is the counterpart of that obtained within the framework of the tracking of the signals emitted by the first emitter 3, as described previously.

In the foregoing, it was assumed that it would be possible to disregard the contribution related to the Doppler effect, especially on account of the fact that the receiver 2 is static in relation to the emitters 3 and 4.

Other examples of implementation of the invention will now be described which apply in particular when the receiver 2 is no longer static in relation to the emitters.

In what follows, the case where the second emitter 4 exhibits a greater Doppler frequency $f_2$ than the Doppler frequency $f_1$ of the first emitter 3 is considered. $f_{loc}$ designates as previously the Doppler frequency of the local signal.

In contradistinction to the examples described in relation to FIGS. 1 to 4 in which the first and second local signals had non-phase-shifted local carriers, in the examples which will now be described the receiver 2 implements first and second phase-shifted local carriers. In these examples, a receiver 2 whose tracking loops may comply with those represented in FIG. 5 is used.

Figure 5:
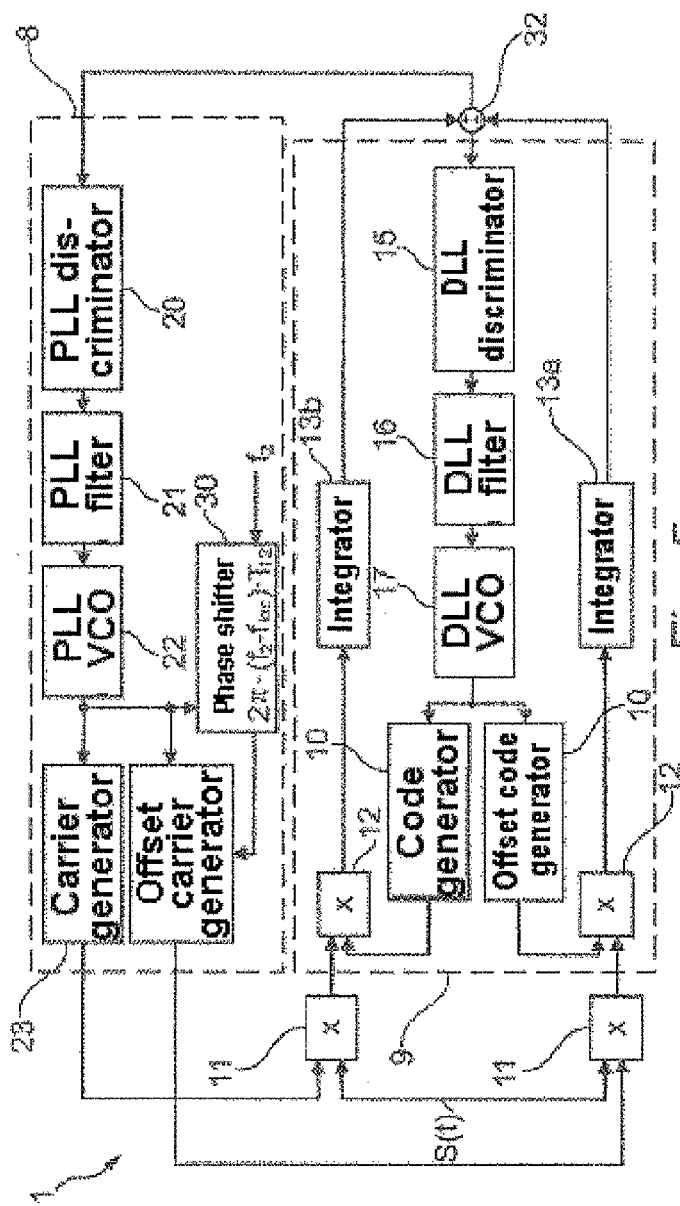
FIG. 5 is a diagram analogous to that of FIG. 4 of a receiver's tracking loop according to a second exemplary implementation of the invention.

The tracking loops represented in FIG. 5 differ from those of FIG. 4 through the presence in the PLL loop 8 of a phase shifter 30 receiving as input the value of the highest Doppler frequency $f_2$, for example from another loop of the receiver, and the signal at the output of the VCO 22. This phase shifter 30 is configured to generate a variable phase shift in the second local carrier on the basis of the frequencies $f_2$ and $f_{loc}$, this phase shift alternately taking a positive value and a negative value. When the code modulating the signals emitted by the emitter of the system that it is sought to track is periodic, the phase shift generated by the phase shifter 30 can change sign every half-period of said code.

The loops represented in FIG. 5 allow the use of a second local carrier of variable phase.

If the correlation quantities are calculated according to an integration time equal to the period of the code used, that is to say according to $T = NT_c = 2T_{1/2}$, then this second local carrier may be phase-shifted by $-2\pi \cdot (f_2 - f_{loc}) \cdot T_{1/2}$ during a first fraction, for example the first half, of the integration time and by $2\pi \cdot (f_2 - f_{loc}) T_{1/2}$ during the remaining fraction, especially the second half, of the integration time.

Thus, if $t_n$ is the initial time of the nth integration of the loop, the local signal used to calculate the first correlation quantity will have the following form, with a first local carrier, $$\sin(2\pi(f_{L1} + f_{loc}) \cdot t + \theta_{loc}) \cdot c_1(t - \tau) \text{ for } t \in ]t_n; t_n + NT_c]$$

and the local signal used to calculate the second correlation quantity will have the following form with a second local carrier, $$\sin(2\pi(f_{L1} + f_{loc})t + \theta_{loc} - \pi \cdot (f_2 - f_{loc})T) \cdot c_1(t - T_{1/2} - \tau) \text{ for } t \in ]t_n; t_n + \frac{T}{2}]$$

and $$\sin(2\pi(f_{L1} + f_{loc})t + \theta_{loc} + \pi \cdot (f_2 - f_{loc})T) \cdot c_1(t - T_{1/2} - \tau) \text{ for } t \in ]t_n + \frac{T}{2}; t_n + T]$$

$f_{loc}$ being the locally induced frequency which corresponds to the control of the VCO 22 in the case of the tracking of the signals emitted by the first emitter 3, its value then being close to $f_1$, $\theta_{loc}$ being the phase of the local carrier and $\tau$ being the correlation delay induced by the receiver to drive the phase shift of the code.

The result of the demodulation by this modified local carrier of the signal received by the receiver 2 may be mixed by the mixers 12 with the three replicas "Early", "in Phase", "Late" phase-shifted by $T_{1/2}$ of the local code $c_1$ before integration by the integrator 13a, and then addition by the summator 32 with the result of the direct demodulation at the output of the integrator 13b. Thereafter, the resulting signal is processed by the discriminators 15 and 20, similarly to what was described with reference to FIG. 4.

To reduce the risk of the glare changing in the course of tracking, that is to say of the signal emitted by the first emitter 3 becoming the signal of larger power and the second emitter 4 being dazzled by glare by the first emitter 3, each reception channel of the receiver can use the Doppler frequency of the other channel even if it is not actually being dazzled by glare. In this way, the chances of being able to remove the interference of one emitter on the other are increased.

As in the examples of FIGS. 1 to 4, the receiver 2 can calculate a first and a second correlation quantity, respectively for the correlation between the signal S and the local signal having the first local carrier and between the signal S and the local signal having the second local carrier.

Equation (4.34) hereinbelow is obtained for the interference terms of the first correlation quantity:

$$\frac{A_2}{T} \int_{t=0}^{t=T_{1/2}} \cos(2\pi(f_2 - f_{loc}) \cdot t + \theta_2 - \theta_{loc}) \cdot c_2(t - d_2) \cdot c_1(t - \tau) \cdot dt$$

$$\frac{A_2}{T} \int_{t=T_{1/2}}^{t=T} \cos(2\pi(f_2 - f_{loc}) \cdot t + \theta_2 - \theta_{loc}) \cdot c_2(t - d_2) \cdot c_1(t - \tau) \cdot dt -$$

$$\frac{A_2}{T} \int_{t=0}^{t=T_{1/2}} \cos(2\pi(f_2 - f_{loc}) \cdot t + \theta_2 - \theta_{loc} - \pi \cdot (f_2 - f_{loc})T) \cdot$$
$$c_2(t - T_{1/2} - d_2) \cdot c_1(t - T_{1/2} - \tau) \cdot dt -$$

$$\frac{A_2}{T} \int_{t=T_{1/2}}^{t=T} \cos(2\pi(f_2 - f_{loc}) \cdot t + \theta_2 - \theta_{loc} + \pi \cdot (f_2 - f_{loc})T) \cdot$$
$$c_2(t - T_{1/2} - d_2) \cdot c_1(t - T_{1/2} - \tau) \cdot dt$$

Equation (4.35) hereinbelow is obtained for the interference terms of the second correlation quantity:

$$-\frac{A_2}{T} \int_{t=0}^{t=T_{1/2}} \cos(2\pi(f_2 - f_{loc}) \cdot t + \theta_2 - \theta_{loc}) \cdot$$
$$c_2(t - T_{1/2} - d_2) \cdot c_1(t - \tau) \cdot dt -$$

$$\frac{A_2}{T} \int_{t=T_{1/2}}^{t=T} \cos(2\pi(f_2 - f_{loc}) \cdot t + \theta_2 - \theta_{loc}) \cdot c_2(t - T_{1/2} - d_2) \cdot c_1(t - \tau) \cdot dt +$$

$$\frac{A_2}{T} \int_{t=0}^{t=T_{1/2}} \cos(2\pi(f_2 - f_{loc}) \cdot t + \theta_2 - \theta_{loc} - \pi \cdot (f_2 - f_{loc})T) \cdot$$
$$c_2(t - d_2) \cdot c_1(t - T_{1/2} - \tau) \cdot dt +$$

$$\frac{A_2}{T} \int_{t=T_{1/2}}^{t=T} \cos(2\pi(f_2 - f_{loc}) \cdot t + \theta_2 - \theta_{loc} + \pi \cdot (f_2 - f_{loc})T) \cdot$$
$$c_2(t - d_2) \cdot c_1(t - T_{1/2} - \tau) \cdot dt$$

By applying the change of variable $t \rightarrow u + T_{1/2}$ for the first and third terms of (4.34) and (4.35), it is possible to simplify expressions (4.34) and (4.35) hereinabove, the latter becoming respectively:

$$\frac{A_2}{T} \int_{t=T_{1/2}}^{t=T} \cos(2\pi(f_2 - f_{loc}) \cdot u + \theta_2 - \theta_{loc} + \pi(f_2 - f_{loc})T) \cdot$$
$$c_2(u + T_{1/2} - d_2) \cdot c_1(u + T_{1/2} - \tau) \cdot du$$

$$\frac{A_2}{T} \int_{t=T_{1/2}}^{t=T} \cos(2\pi(f_2 - f_{loc}) \cdot t + \theta_2 - \theta_{loc}) \cdot c_2(t - d_2) \cdot c_1(t - \tau) \cdot dt -$$

$$\frac{A_2}{T} \int_{t=T_{1/2}}^{t=T} \cos(2\pi(f_2 - f_{loc}) \cdot u + \theta_2 - \theta_{loc}) \cdot c_2(u - d_2) \cdot c_1(u - \tau) \cdot du -$$

$$\frac{A_2}{T} \int_{t=T_{1/2}}^{t=T} \cos(2\pi(f_2 - f_{loc}) \cdot t + \theta_2 - \theta_{loc} + \pi \cdot (f_2 - f_{loc})T) \cdot$$
$$c_2(t - T_{1/2} - d_2) \cdot c_1(t - T_{1/2} - \tau) \cdot dt$$

and:

$$-\frac{A_2}{T}\int_{t=T_{1/2}}^{t=T}\cos(2\pi(f_2-f_{loc})\cdot u+\theta_2-\theta_{loc}+\pi\cdot(f_2-f_{loc})T)\cdot$$

$$c_2(u-d_2)\cdot c_1(u+T_{1/2}-\tau)\cdot du-$$

$$\frac{A_2}{T}\int_{t=T_{1/2}}^{t=T}\cos(2\pi(f_2-f_{loc})\cdot t+\theta_2-\theta_{loc})\cdot c_2(t-T_{1/2}-d_2)\cdot c_1(t-\tau)\cdot dt +$$

$$\frac{A_2}{T}\int_{t=T_{1/2}}^{t=T}\cos(2\pi(f_2-f_{loc})\cdot u+\theta_2-\theta_{loc})\cdot$$

$$c_2(u+T_{1/2}-d_2)\cdot c_1(u-\tau)\cdot du +$$

$$\frac{A_2}{T}\int_{t=T_{1/2}}^{t=T}\cos(2\pi(f_2-f_{loc})\cdot t+\theta_2-\theta_{loc}+\pi\cdot(f_2-f_{loc})T)\cdot$$

$$c_2(t-d_2)\cdot c_1(t-T_{1/2}-\tau)\cdot dt$$

It is also possible to rearrange the two expressions hereinabove by taking account of the fact that all the integrals are now done over the same interval and that the codes $c_1$ and $c_2$ are $2T_{1/2}$ periodic, that is to say $c_1(t+T_{1/2})=c_1(t-T_{1/2})$.

Under these conditions, all the terms in the two expressions immediately hereinabove compensate one another and are therefore equal to 0.

Thus, the choice of the local carriers hereinabove makes it possible to eliminate the interference, even taking account of the Doppler effect.

In the examples which have just been described, each emitter of the system 1 simultaneously emits two signals modulated by one and the same code which is delayed from one signal to the next. Nonetheless, the invention is not limited to such a double emission of signals by each emitter of the system 1.

Another exemplary implementation of the invention will now be described with reference to FIG. 6.

The system 1 comprises in this example a receiver 2 which comprises for example tracking loops such as described with reference to FIG. 5, a plurality of first emitters 3 and a second emitter 4.

The first emitters 3 are for example satellites forming a constellation and the second emitter 4 is a pseudolite. The second emitter 4 is in the example considered fixed with respect to the ground, in contradistinction to the first emitters 3. The system 1 is for example of GNSS type.

Figure 6:
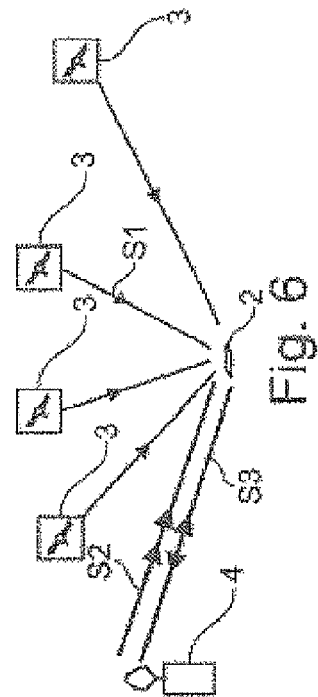
FIG. 6 is a view analogous to FIG. 1 of a system in which the method according to the invention may be implemented.

As represented in FIG. 6, the pseudolite 4 emits signals S2 and S3 which exhibit a greater power than that of the signals emitted by the satellites 3. The ratio between the power of a signal emitted by the pseudolite 4 and of a signal emitted by each satellite 3 is for example greater than 24 dB.

The system 1 considered makes it possible in this example to reduce, especially to eliminate, the result for the intercorrelation calculated by the receiver 2 between the signals emitted by the satellites 3 and the signals emitted by the pseudolite 4.

Of subsequent interest is the signal S1 emitted by one of the satellites 3 and that it is sought to track.

The signal received at the level of the antenna of the receiver 2 is in the example described of the form indicated by equation (4.40):

$$S(t)=\sum_{k=1}^{ns}a_k\cdot\sin((\omega+\omega_k)\cdot t+\theta_k)\cdot D_k(t)\cdot c_k(t-d_k)+$$

-continued $$n(t)+A_{pl}\cdot\sin((\omega+\omega_{pl})\cdot t+\theta_{pl})\cdot D_{pl}(t)\cdot c_{pl}(t-d_{pl})-$$

$$A_{pl}\cdot\sin((\omega+\omega_{pl})\cdot t+\theta_{pl})D_{pl}(t)\cdot c_{pl}(t-d_{pl}-T_{1/2})$$

With:
- $n_s$: the number of satellites,
- $\omega$: the angular frequency at the carrier frequency,
- $a_k$: the amplitude of satellite k,
- $\omega_k$: the angular frequency due to the Doppler on satellite k including the drift of the clock bias,
- $\theta_k$: the phase of the carrier of the signal of satellite k,
- $D_k$: the navigation message of satellite k,
- $c_k$: the code of satellite k, being a Gold code,
- $d_k$: the pseudodistance between the receiver and satellite k,
- $A_{pl}$: the amplitude of the signal of the pseudolite,
- $\omega_{pl}$: the Doppler angular frequency on the pseudolite including the drift of the clock bias,
- $\theta_{pl}$: the phase of the carrier of the signal of the pseudolite,
- $D_{pl}$: the navigation message of the pseudolite,
- $c_{pl}$: the code of the pseudolite, being a Gold code, and
- $d_{pl}$: the pseudodistance between the receiver and the pseudolite.

In the example considered, only the pseudolite 4 simultaneously emits two signals differing by a phase shift of 180° and by a delay of the code $c_{pl}$ equal to half a period of the latter, in contradistinction to the examples described previously, in which all the emitters simultaneously emitted two signals, the two signals being phase-shifted and modulated by one and the same code which is delayed for one of the two signals. In the example of FIG. 6 it is indeed considered that the signal of the pseudolite 4 is practically undisturbed by the signals of the satellites 3.

According to a first step, the signal of the pseudolite 4 is acquired so as to extract $\omega_{pl}$ therefrom, by exploiting the assumption according to which the amplitude $A_{pl}$ of the pseudolite 4 is very large compared with the amplitude $a_k$ of each satellite, for all k.

According to a second step, the first and second correlation quantities are calculated, similarly to what was described previously, by correlating the signal S, respectively with:
- a local signal modulated by the code modulating the signal emitted by the satellite i and having a first local carrier, the expression for this signal being given by equation (4.41), hereinbelow and,
- a local signal modulated by the code modulating the satellite i delayed by a half-period $T_{1/2}$ of said code and having a second local carrier generated as explained in relation to FIG. 5 and the expression for which is given by equation (4.42) hereinbelow:

$$\sin((\omega+\omega_i)t+\theta_{loc})\cdot c_i(t-\tau) \qquad (4.41)$$

and $$\sin\left((\omega+\omega_i)t+\theta_{loc}-\frac{(\omega_i-\omega_{pl})\cdot T}{2}\right)\cdot c_i(t-\tau-T_{1/2}) \text{ for } t\in\left]t_n;\right. \qquad (4.42)$$

$$\left.t_n+\frac{T}{2}\right]$$

$$\sin\left((\omega+\omega_i)t+\theta_{loc}+\frac{(\omega_i-\omega_{pl})\cdot T}{2}\right)\cdot c_i(t-\tau-T_{1/2}) \text{ for } t\in\left]t_n+\right.$$

$$\left.\frac{T}{2};t_n+T\right]$$

with $t_n$ the instant at which the integration starts, $\theta_{loc}$ the phase of the local carrier, $\tau$ the controlled phase shift of the code and $T=2T_{1/2}$ the integration time.

Figure 7:
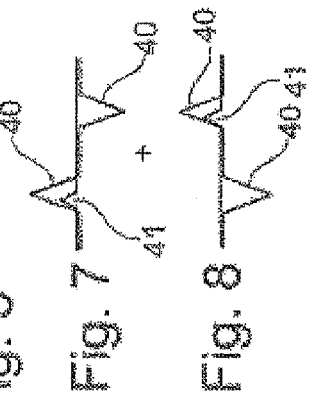
FIGS. 7 and 8 represent respectively first and second correlation quantities calculated by the receiver of the system according to FIG. 6.

FIG. 7 represents the correlation function for the correlation between the signals of the pseudolite 4 and of the satellite 3 as a function of the phase shift $\tau$ of the local code.

Two peaks 40 are observed, phase-shifted by 180° and shifted by half a period of the code $c_i$ modulating the signal S1 emitted by the satellite 3. These peaks 40 convey the intercorrelation between pseudolite 4 and emitter 3, as well as a single peak 41 of much lower amplitude than that of a peak 40 and corresponding to the signal of the satellite 3 that it is sought to track.

Figure 8:
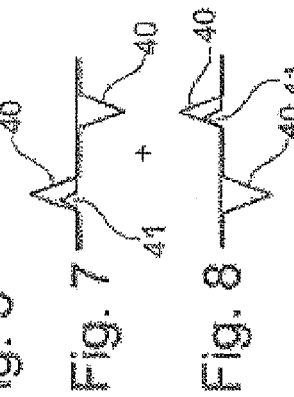

Similarly, FIG. 8 represents the correlation function for the correlation between the signals emitted by the pseudolite 4 and the satellite 3 whose signal it is sought to track as a function of the phase shift $\tau$ of the local code.

In FIG. 8 two peaks 40 are observed, phase-shifted by 180° and shifted by half a period of the code $c_i$ modulating the signal emitted by the satellite 3, these peaks 40 conveying the intercorrelation between pseudolite and emitter, as well as a single peak 41 of much lower amplitude than that of a peak 40 and corresponding to the signal of the satellite 3 that it is sought to track.

Figure 9:
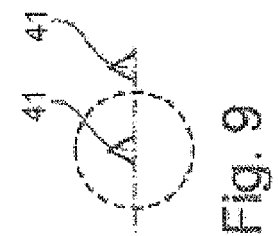
FIG. 9 represents the quantity obtained by adding together the first and second correlation quantities according to FIGS. 7 and 8, and FIGS. 10 and 11 represent results for the tracking of a satellite signal by a receiver, respectively according to the prior art and according to the invention.

It is noted that the positions of the peaks 40 are inverted between FIG. 7 and FIG. 8, thereby allowing, when adding the first and second correlation quantities, the disappearance of the peaks 40, as represented in FIG. 9. Only two peaks 41 remain, shifted by half a period of the code $c_i$. It is thus understood in view of these FIGS. 6 to 9, that the method which has just been described makes it possible to preserve just the terms of the signal that it is sought to track.

Analytically, it is possible to calculate the terms of the intercorrelation between the signals emitted by the pseudolite 4 and the signals emitted by the satellites 3 for the first, respectively second, correlation quantity. These are given in equations (4.43), respectively (4.44), hereinbelow.

$$\frac{A_{pl}}{T} \int_{t=0}^{t=T} \cos((\omega_{pl} - \omega_{loc}) \cdot t + \theta_{pl} - \theta_{loc}) \cdot c_{pl}(t - d_{pl}) \cdot c_i(t-\tau) \cdot dt - \quad (4.43)$$

$$\frac{A_{pl}}{T} \int_{t=0}^{t=T_{1/2}} \cos\left((\omega_{pl} - \omega_{loc}) \cdot t + \theta_{pl} - \theta_{loc} - \frac{(\omega_{pl} - \omega_{loc}) \cdot T}{2}\right) \cdot$$

$$c_{pl}(t - d_{pl} - T_{1/2}) \cdot c_i(t - \tau - T_{1/2}) \cdot dt -$$

$$\frac{A_{pl}}{T} \int_{t=T_{1/2}}^{t=T} \cos\left((\omega_{pl} - \omega_{loc}) \cdot t + \theta_{pl} - \theta_{loc} + \frac{(\omega_{pl} - \omega_{loc}) \cdot T}{2}\right) \cdot$$

$$c_{pl}(t - d_{pl} - T_{1/2}) \cdot c_i(t - \tau - T_{1/2}) \cdot dt$$

$$-\frac{A_{pl}}{T} \int_{t=T_0}^{t=T} \cos((\omega_{pl} - \omega_{loc}) \cdot t + \theta_{pl} - \theta_{loc}) \cdot \quad (4.44)$$

$$c_{pl}(t - d_{pl} - T_{1/2}) \cdot c_i(t-\tau) \cdot dt +$$

$$\frac{A_{pl}}{T} \int_{t=0}^{t=T/2} \cos\left((\omega_{pl} - \omega_{loc}) \cdot t + \theta_{pl} - \theta_{loc} - \frac{(\omega_{pl} - \omega_{loc}) \cdot T}{2}\right) \cdot$$

$$c_{pl}(t - d_{pl}) \cdot c_i(t - \tau - T_{1/2}) \cdot dt +$$

$$\frac{A_{pl}}{T} \int_{t=T_{1/2}}^{t=T} \cos\left((\omega_{pl} - \omega_{loc}) \cdot t + \theta_{pl} - \theta_{loc} + \frac{(\omega_{pl} - \omega_{loc}) \cdot T}{2}\right) \cdot$$

$$c_{pl}(t - d_{pl}) \cdot c_i(t - \tau - T_{1/2}) \cdot dt$$

By adding together the first and second correlation quantities, the terms of expressions (4.43) and (4.44) all compensate one another, using the same changes of variable as for the example described with reference to FIG. 5.

As has just been seen, the invention may be used with an outside GNSS constellation and a pseudolite. The signal of the pseudolite is advantageously always that which causes glare and the system advantageously comprises just a single emitter whose signal has a greater power than that of the other signals emitted by the other emitters of the system, in such a way that this emitter may dazzle the receiver 2 through glare.

In the example which has just been described, the signals emitted by the pseudolite 4 comprise a navigation message D but, in a variant, this signal may be devoid of any navigation message or may transmit a navigation message of lower bitrate than that of a satellite. This bitrate is for example less than 50 Hz, this value being the current bitrate of the GPS message.

FIGS. 10 and 11 are tables showing the performance in terms of tracking by the receiver 2 of signals emitted by the satellites, respectively according to the prior art and according to the invention such as described with reference to FIGS. 6 to 9.

In these tables, the first column on the left corresponds to the signal/noise ratio of the pseudolite 4 and each row of the table corresponds to a simulation of a duration equal to 10 seconds for a given signal/noise ratio of the pseudolite.

The first value given for the signal/noise ratio, $-\infty$, signifies that there is no pseudolite, this row corresponding in fact to a reference datum.

For each satellite 3, the mean error in the pseudodistance during the simulation is measured on the one hand, as is the standard deviation in this error. The results are provided in meters and the symbol "nf" for ("near-far") signifies that the glare is such that no stable value of pseudodistance can be obtained by the receiver for this satellite.

As may be noted in FIG. 10, for each satellite, the effect of the interference caused by the presence of the pseudolite is firstly manifested by a degradation in the measurement of the mean of the pseudodistance. When the power of the signal emitted by the pseudolite 4 increases, satellite No. 3 can no longer be tracked. The differences in behavior of the various satellites are explained by the Doppler effect. Satellite No. 3, which has the same Doppler frequency as the pseudolite 4, is disturbed as soon as the signal/noise ratio of the pseudolite exceeds 1.2 dB, that is to say when the power of the signal emitted by the pseudolite exceeds by 20 dB the power of the signal emitted by the satellite. It is noted that satellites No. 1 and 2, which have a different Doppler frequency from that of the pseudolite, are spared by glare until the pseudolite exhibits a significant signal/noise ratio. As soon as this signal/noise ratio attains 31.2 dB, the signals emitted by satellites No. 1 and 2 can no longer be tracked.

Comparison with FIG. 11 reveals that whatever the power of the signals emitted by the pseudolite, manifested by the signal/noise ratio, no dazzle by glare occurs.

Thus, the double emission, such as explained hereinabove, by the pseudolite of signals makes it possible to reduce, or indeed to eliminate, the glare of the receiver when it seeks to track the signal emitted by one of the satellites in the presence of an emitter of higher power.

To summarize, the principle set forth hereinabove of the Technique of Double Emission makes it possible, in a system having at least two emitters one of which emits on the same antenna two signals phase-shifted by half a period of the periodic code modulating said signals emitted by this emitter, and by phase shifting the second signal by 180° with respect to the first signal, through a simple addition of two correlation quantities conducted in parallel for the correlation between the signals emitted by the emitters, to remove the cross-correlation terms of the other emitter, without affecting the signal of the one that it is sought to track.

To take into account the Doppler difference between the two emitters and the dynamics of the receiver, a local signal having different local carriers can be used to calculate the correlation quantities.

The invention is not limited to the examples which have just been described.

The invention claimed is:

1. A method for reducing a glare of at least one receiver within a geolocation system, the system comprising:
   at least one first emitter emitting at least one first signal modulated by a first code,
   at least one second emitter emitting at least one second signal modulated by a repetitive and potentially variable second code and a third signal phase-shifted with respect to the second signal, the third signal being modulated by the second code delayed by a first delay, and
   the receiver being configured to detect the signals emitted by the first and second emitters and implementing, for a tracking of the first signal, a local signal, wherein the method comprises:
       a first correlation quantity is calculated for a correlation between the local signal of the receiver modulated by the first code and a signal resulting from a combination of at least the first, second, and third signals,
       a second correlation quantity is calculated for a correlation between the local signal of the receiver, modulated by the first code delayed by the first delay and the signal resulting from the combination of at least the first, second and third signals, and
       the first and second correlation quantities are combined to improve a signal/noise ratio of the first signal received by the receiver while reducing the glare of the receiver by the second signal,
       wherein the first delay is equal to half a duration of the second code, with a precision of within 1% of a value of half of the duration of the second code and in which a phase shift between the second and the third signal is equal to 180° with a precision of within 18°.

2. The method as claimed in claim 1, wherein the second code is periodic.

3. The method as claimed in claim 2, wherein the first delay is equal to a half-period of the second code, with a precision of within 1% of a value of half the duration of the second code.

4. The method as claimed in claim 1, wherein a ratio between a power of the second signal and a power of the first signal is greater than 24 dB.

5. The method as claimed in claim 1, wherein the second emitter is fixed with respect to the receiver.

6. The method as claimed in claim 1, wherein the first emitter is mobile with respect to the receiver.

7. The method as claimed in claim 1, wherein the first and second signals are emitted simultaneously.

8. The method as claimed in claim 1, wherein the second and third signals are emitted simultaneously.

9. The method as claimed in claim 1, wherein the first, second and third signals have a same carrier frequency.

10. The method as claimed in claim 9, wherein the carrier frequency is a frequency L1 and the first and the second codes are C/A codes.

11. The method as claimed in claim 1, wherein the first emitter is a satellite.

12. The method as claimed in claim 1, being implemented in an outside setting.

13. The method as claimed in claim 1, wherein the local signal used to calculate the first correlation quantity has a local carrier in phase with the local carrier of the local signal used to calculate the second correlation quantity.

14. The method as claimed in claim 1, wherein the local signal used to calculate the second correlation quantity has a local carrier phase-shifted with respect to a phase carrier of the local signal used to calculate the first correlation quantity.

15. The method as claimed in claim 1, wherein the first and second correlation quantities are calculated and/or combined together by the receiver.

16. A geolocation system comprising:
   a first emitter emitting at least one first signal modulated by a first code,
   at least one second emitter emitting at least one second signal modulated by a repetitive and potentially variable second code, and
   at least one receiver configured to detect the signals emitted by the first and second emitters and utilizing, for the detection of the first signal, a local signal,
       the second emitter being configured to emit, the second signal and a third signal phase-shifted with respect to the second signal and modulated by the second code delayed by a first delay,
       the first delay being equal to half of a duration of the second code, with a precision of within 1% of a value of half the duration of the second code and a phase shift between the second and the third signal being equal to 180° with a precision within 18°, and a first correlation quantity for a correlation between the local signal of the receiver modulated by the first code and a signal resulting from a combination of at least the first, second and third signals and a second correlation quantity for a correlation between the local signal of the receiver, modulated by the first code delayed by the first delay and the signal resulting from the combination of at least the first, second and third signals and, the first and second correlation quantities being calculated and combined to improve a signal/noise ratio of the first signal received by the receiver while reducing a glare of the receiver by the second signal.

17. The system as claimed in claim 16, the second code being periodic and the first delay being equal to a half-period of the second code, with a precision of within 1% of a value of half the duration of the second code.

18. An emitter, used within a geolocation system, said system comprising at least one other emitter emitting at least one first signal modulated by a first code and utilizing a local signal for the detection of the first signal, and a receiver configured to detect the signals emitted by said emitter and the other emitter, said emitter being configured to:
   emit a second signal modulated by a second code and third signal phase-shifted with respect to said second signal, the third signal being modulated by said second code delayed by a first delay,
   the first delay being equal to half a duration of the second code, with a precision of within 1% of a value of half the duration of the second code and a phase shift between the second and the third signal being equal to 180° with a precision of within 18°, a first correlation quantity for a correlation between the local signal of the receiver modulated by the first code and a signal resulting from a combination of at least the first, second and third signals and a second correlation quantity for a correlation between the local signal of the receiver modulated by the first code delayed by the first delay and the signal resulting from the combination of at least the first, second and third signals being calculated and combined to improve a signal/noise ratio of the first signal received by the receiver while reducing a glare of the receiver by the second signal.

19. A receiver, used within a geolocation system, said system comprising at least one first emitter emitting at least one first signal modulated by a first code and at least one second emitter emitting at least one second signal modulated by a repetitive and potentially variable second code, the second emitter furthermore emitting, at least one third signal phase-shifted with respect to the second signal and modulated by the second code delayed by a first delay, the first delay being equal to half a duration of the second code, with a precision of within 1% of a value of half the duration of the second code and the phase shift between the second and the third signal being equal to 180° with a precision of within 18°, the receiver being configured to:

detect and demodulate the first signal, the detection of the first signal implementing a local signal of the receiver, calculate a first correlation quantity for the correlation between the local signal of the receiver modulated by the first code and a signal resulting from a combination of at least the first, second and third signals, calculate a second correlation quantity for the correlation between the local signal of the receiver modulated by the first code delayed by the first delay and the signal resulting from the combination of at least the first, second and third signals and, combine the first and second correlation quantities.

* * * * *